Dec. 27, 1960 H. HUBBELL ET AL 2,966,654
WIRE BRIDGE FOR MOUNTING ELECTRICAL WIRING DEVICES
Original Filed June 19, 1956
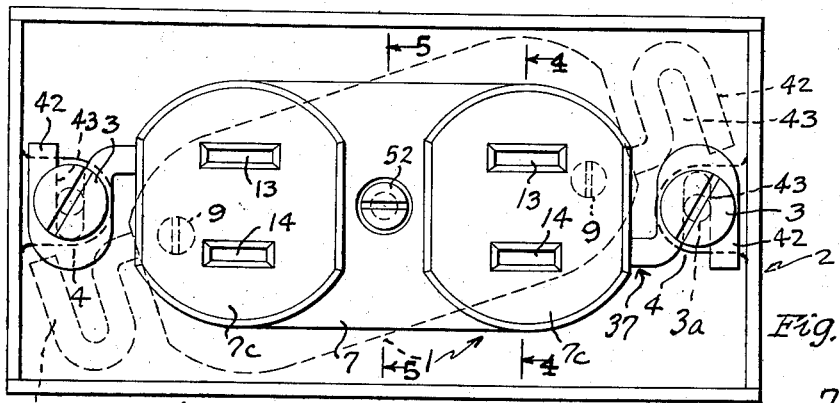
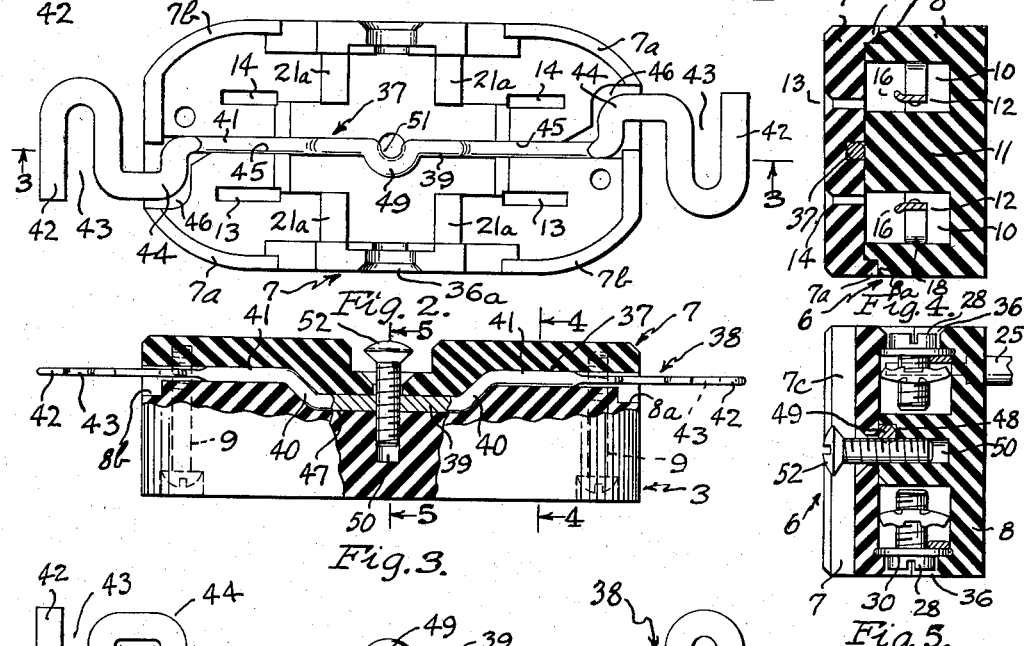
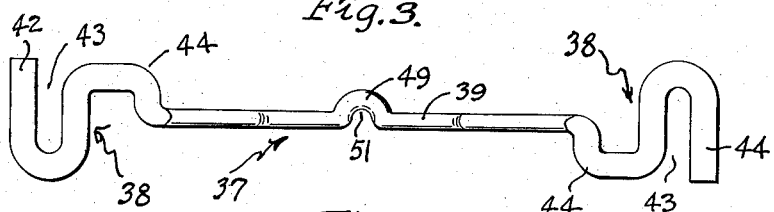
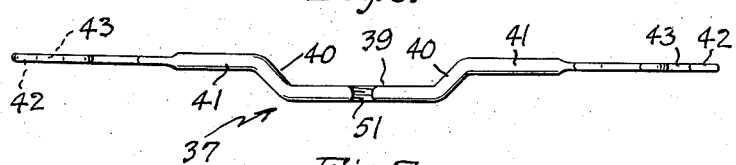
INVENTORS
Harvey Hubbell
Joseph F. Healy
By Wooster & Davis ATTORNEYS

United States Patent Office

2,966,654
Patented Dec. 27, 1960

2,966,654

WIRE BRIDGE FOR MOUNTING ELECTRICAL WIRING DEVICES

Harvey Hubbell, Southport, and Joseph F. Healy, Westport, Conn., assignors to Harvey Hubbell, Incorporated, Bridgeport, Conn., a corporation of Connecticut Original application June 19, 1956, Ser. No. 592,298. Divided and this application Mar. 31, 1958, Ser. No. 725,060

4 Claims. (Cl. 339—133)

This invention relates to electrical wiring devices, and particularly to a duplex outlet receptacle, switch, or similar devices adapted to be mounted in wall outlet boxes, and has for an object to provide an improved construction for such a device in which the bridge or yoke for mounting the receptacle or similar electrical device may be constructed of swaged wire.

Another object is to provide a construction in which the screws for mounting the receptacle or similar electrical device in a wall outlet box may be first mounted in the box, and then the receptacle or other electrical device may be inserted in the box in a partially turned position, and turned from this to the normal position for mounting the device on the screws.

With the foregoing and other objects in view, we have devised the construction illustrated in the accompanying drawing forming a part of this specification. It is, however, to be understood the invention is not limited to the specific details of construction and arrangement shown but may embody various changes and modifications within the scope of the invention.

In this drawing:

Fig. 1 is a front view showing how the device is mounted in a wall outlet box;

Fig. 2 is a bottom view of the top section of the body of the device with the mounting yoke or bridge in place therein;

Fig. 3 is a partial side elevation and partial longitudinal section of the device, the section being substantially on line 3—3 of Fig. 2;

Fig. 4 is a transverse section substantially on line 4—4 of Figs. 1 and 3;

Fig. 5 is a transverse section substantially on line 5—5 of Figs. 1 and 3;

Fig. 6 is a plan view of the yoke or bridge for mounting the device in a wall box, and Fig. 7 is an edge view thereof looking from the bottom of Fig. 6.

This application is a division of our prior application Serial No. 592,298, filed June 19, 1956.

The receptacle is shown in Fig. 1 mounted in the conventional type of sheet metal wall box 2 to which the lead wires (not shown) are led from the house wiring system and connected to the contacts within the receptacle. The receptacle is mounted in the box on screws 3 mounted in the inwardly extending lugs or ears 4 on the end walls of the box.

This improved form of receptacle comprises a body or housing 6 of suitable molded insulating material, such, for example, as "Bakelite" or similar material, and is made in two sections comprising a top section 7 and a bottom section 8 secured together by suitable screws 9, in this case passing through the lower section 8 and threaded into the upper section, either directly or by a suitable insert molded in the insulating material. The lower section is recessed in its top wall at the opposite ends thereof, as shown at 8a and 8b, and the top section has corresponding ribs 7a and 7b seated in these recesses to thus retain the two sections in proper alignment.

The lower section 8 is provided with two pairs of longitudinally spaced chambers 10 and also laterally spaced and separated by the intermediate wall 11, and in these chambers are mounted the spring contacts 12 to be engaged by the blade contacts of attachment plug caps (not shown) inserted through spaced entrance slots 13 and 14 in the bosses 7c of the top section 7 and leading to these chambers in alignment with the contacts.

The housing or body with the contacts mounted therein is mounted in the wall box 2 by a yoke or bridge 37 extending longitudinally of the housing and located between the upper and lower sections 7 and 8. This bridge is made from a piece of round wire swaged to a flat or oval shaped cross section at its opposite ends 38, this section having flat surfaces at its opposite sides with rounded edges as it is swaged from a round wire. The intermediate portion between these flattened ends is preferably left in its round original cross section but has an intermediate portion 39 offset laterally from the end portions as indicated at 40, leaving a connecting portion 41 between the offsets and the flattened end portions. The flattened end portions 38 comprise substantially U-shaped outer end portions 42 with a slot or recess 43 opening through one side, and a shorter but oppositely facing substantially U-shaped portion 44 connecting the inner leg of this outer U-shaped portion with the end of the intermediate portion 41. This outer end thus forms a hook opening laterally at each end of the bridge, which may be hooked over the shanks of the mounting screws 3 in the lugs 4 of the wall box to thus mount the receptacle in this box. The open sides of these hooks face in opposite directions. In mounting this bridge in the housing of the receptacle the connecting portions 41 and the inner portions 44 of the flattened ends are seated in an interrupted channel 45 with an offset recess 46 at each opposite end of the channel formed in the lower surface of the top housing member 7, and the intermediate or central offset portion 39 is seated in a channel 47 in the top of the longitudinal intermediate wall 11 of the lower section 8 of the housing, there being a lateral curved offset recess 48 (Fig. 5) in one side of this channel at the center of the housing to receive a similar offset portion 49 in the central portion 39 of the bridge. This construction and arrangement effectively and properly positions and rigidly secures the bridge in the housing, and in the channel 47 at the inner side of the offset recess 48 is provided a socket 50 to receive the shank of the screw 52 passing through an opening in the front wall of the top section 7 and having a threaded shank engaging screw threads 51 pressed in the inner or concave side of the offset portion 49, the screw being supported on its opposite side by the walls of the socket 50. This screw is for fastening the usual face plate or cover plate (not shown) of either metal or plastic material, used to cover the open side of the wall box after the receptacle has been mounted therein.

With this construction of mounting the bridge or yoke it is not necessary to remove the screws 3 in mounting the receptacle in the wall box. As indicated by the broken lines in Fig. 1, the receptacle may be placed in the box tilted or turned counterclockwise to permit passage of the hooked end portions 42 by the heads of the screws 3, and then this receptacle may be turned clockwise to pass these hooked portions behind the heads of the screws and between these heads and the ears or lugs 4 on the wall box, as indicated in full lines. The shank 3a of the screw enters the recess 43 of the hooked end by this movement and after shifting to this position, the screws 3 may be easily and quickly tightened to clamp the hooked ends 42 between the heads of the screws and the ears 4.

The receptacle may be as easily dismounted or removed from the wall box without the necessity of removing the screws 3, by merely releasing the screws a short distance and then swinging the receptacle counterclockwise to the broken line position to release the hooked ends from the screws, after which it may be readily removed from the wall box.

It will be seen from the above that this provides a means for mounting a receptacle or similar electrical device, which is of very simple construction and is a novel means for mounting the device in the wall box. The mounting yoke or bridge may be made from round metal wire of the desired size, by merely bending and swaging to the proper shape. It may be inserted in the box at an angular position and then turned by a partial revolution to the proper position and secured therein by setting up the mounting screws which are merely loosened in the box and do not have to be removed therefrom.

Having thus set forth the nature of our invention, we claim:

1. An electric wiring device comprising: a housing of electrical insulating material adapted to be mounted in the wall box of a house wiring system; said housing comprising a pair of superimposed sections secured to each other and having opposing surfaces; one of said surfaces provided with a longitudinal extending channel including a laterally offset recess; the other of said surfaces provided with an interrupted longitudinally extending channel having a laterally offset recess at each opposite end; a mounting bridge mounted on and extending longitudinally of said housing including an intermediate round wire portion seated in said channels, flattened end portions projecting beyond the opposite ends of the housing comprising hooks having their open ends facing laterally and adapted to receive the shanks of headed mounting screws of the wall box under said heads to mount the wiring device in the wall box, and laterally offset connecting portions between said intermediate portion and said end portions; and said intermediate portion having a laterally offset portion disposed in said first mentioned offset recess, and said connecting portions disposed in the offset recesses associated with the interrupted channel, whereby turning of the bridge in the housing is prevented.

2. The device defined in claim 1 wherein the open sides of said hooks face in laterally opposite directions.

3. An electric wiring device comprising: a housing of insulating material adapted to be mounted in the wall box of a house wiring system; said housing comprising a pair of superimposed sections secured to each other and having opposed surfaces; one of said surfaces having a longitudinally extending channel including a laterally offset recess; a mounting bridge mounted on and extending longitudinally of the housing comprising an intermediate round wire portion in said channel and flattened end portions projecting beyond the ends of the housing; said intermediate portion having a laterally offset portion disposed in said offset recess whereby turning of the bridge in the housing is prevented; said end portions having hooks with their open sides facing laterally and adapted to receive the shanks of headed mounting screws of the wall box under said heads to mount the wiring device in the wall box; said laterally offset portion being curved and provided with screw threads on the concave side thereof, and one of said sections having an opening and the other of said sections having a socket which are aligned with each other and with the concave side of said offset portion to receive a securing screw for a face plate for the open side of the wall box, whereby said securing screw cooperates with said opening and socket and said screw threads to retain the face plate in position relative to the housing and wall box.

4. The device defined in claim 3 wherein the open sides of said hooks face in laterally opposite directions.

References Cited in the file of this patent

UNITED STATES PATENTS

| | | |
|---|---|---|
| 422,058 | McIntire | Feb. 25, 1890 |
| 582,462 | Dickerson | May 11, 1897 |
| 1,501,029 | Sargent | July 8, 1924 |
| 2,246,931 | Chiffey | June 24, 1941 |
| 2,286,097 | Johnson | June 9, 1942 |
| 2,315,523 | Hubbell | Apr. 6, 1943 |